US012423577B2

(12) United States Patent
Jourdan et al.

(10) Patent No.: US 12,423,577 B2
(45) Date of Patent: Sep. 23, 2025

(54) MACHINE-LEARNING FOR 3D SEGMENTATION

(71) Applicant: DASSAULT SYSTEMES, Vélizy-villacoublay (FR)

(72) Inventors: Ariane Jourdan, Vélizy-villacoublay (FR); Eloi Mehr, Vélizy-villacoublay (FR)

(73) Assignee: DASSAULT SYSTEMES, Vélizy-Villacoublay (FR)

( * ) Notice: Subject to any disclaimer, the term of this patent is extended or adjusted under 35 U.S.C. 154(b) by 842 days.

(21) Appl. No.: 17/691,703

(22) Filed: Mar. 10, 2022

(65) Prior Publication Data
US 2022/0292352 A1   Sep. 15, 2022

(30) Foreign Application Priority Data

Mar. 10, 2021 (EP) .................... 21305293

(51) Int. Cl.
*G06K 9/34* (2006.01)
*G06N 3/08* (2023.01)
*G06T 7/11* (2017.01)
*G06T 9/00* (2006.01)
*G06T 17/00* (2006.01)
*G06T 17/20* (2006.01)
*G06N 20/00* (2019.01)

(52) U.S. Cl.
CPC .................. *G06N 3/08* (2013.01); *G06T 7/11* (2017.01); *G06T 9/002* (2013.01); *G06T 17/00* (2013.01); *G06T 17/20* (2013.01); *G06N 20/00* (2019.01); *G06T 2200/04* (2013.01); *G06T 2207/20081* (2013.01); *G06T 2207/20084* (2013.01)

(58) Field of Classification Search
CPC .. G06N 3/08; G06N 20/00; G06T 7/11; G06T 9/002; G06T 17/00; G06T 17/20; G06T 2200/04; G06T 2207/20081; G06T 2207/20084; G06T 7/162; G06T 2207/10028; G06T 2207/30164; G06T 19/20
See application file for complete search history.

(56) References Cited

PUBLICATIONS

Li Yi, Deep Part Induction from Articulated Object Pairs, Sep. 19, 2018, arXiv:1809.07417v1, 18.*

(Continued)

*Primary Examiner* — Xin Jia
(74) *Attorney, Agent, or Firm* — Oblon, McClelland, Maier &Neustadt, L.L.P.

(57) ABSTRACT

A computer-implemented method of machine-learning including obtaining a dataset of training samples. Each training sample includes a pair of 3D modeled object portions labelled with a respective value. The respective value indicates whether or not the two portions belong to a same segment of a 3D modeled object. The method further includes learning a neural network based on the dataset. The neural network takes as input two portions of a 3D modeled object representing a mechanical part and outputs a respective value. The respective value indicates an extent to which the two portions belong to a same segment of the 3D modeled object. The neural network is thereby usable for 3D segmentation. The method constitutes an improved solution for 3D segmentation.

14 Claims, 3 Drawing Sheets
(1 of 3 Drawing Sheet(s) Filed in Color)

(56) References Cited

PUBLICATIONS

Q. Wu, Constructing 3D CSG Models from 3D Raw Point Clouds, Computer Graphics Forum, 2018•Wiley Online Library, 221-232.*

The extended European search report issued Aug. 31, 2021, in European Application No. 21305293.9, citing documents AB-AC therein, 8 pgs.

Ling Zhang et al., Unsupervised Feature Learning for Point Cloud Understanding by Contrasting and Clustering Using Graph Convolutional Neural Networks, 2019 International Conference on 3D Vision (3DV). IEEE, Sep. 16, 2019, 10 pgs.

Li Yi et al., Deep Part Induction from Articulated Object Pairs, ACM Trans. Graph., vol. 37, No. 6, Article 209, Nov. 2018, 15 pgs.

L. Li, M., et al., Supervised Fitting of Geometric Primitives to 3D Point Clouds. In CVPR, 2019, 11 pgs.

K. Mo, et al., PartNet: A Large-scale Benchmark for Fine-grained and Hierarchical Pan-level 30 Object Understanding. In CVPR, 2019, 23 pgs.

W. Wang, et al., SGPN: Similarity Group Proposal Network for 3D Point Cloud Instance Segmentation. In CVPR, 2018, 13 pgs.

T. Luo, et al., Learning to Group: A Bottom-Up Framework for 3D Part Discovery in Unseen Categories. In ICLR, 2020, 23 pgs.

C. Qi, et al., Deep Hough Voting for 3D Object Detection in Point Clouds. In ICCV, 2019, 14 pgs.

C. Qi, et al., PointNet: Deep Learning on Point Sets for 3D Classification and Segmentation. In CVPR, 2017, 19 pgs.

C. Qi, et al., PointNet++: Deep Hierarchical Feature Learning on Point Sets in a Metric Space. In NIPS, 2017, 10 pgs.

Y. Wang, et al., Dynamic Graph CNN for Learning on Point Clouds. In ACM, 2019, 13 pgs.

R. Hanocka, et al., MeshCNN: A Network with an Edge. In ACM, 2019, 12 pgs.

Kaiser A. et al., A Survey of Simple Geometric Primitives Detection Methods for Captured 3D Data, Computer Graphics Forum, ,Volum 00 (2018), No. 00, 30 pgs.

Wu. Q et al., Constructing 3D CSG Models from 3D Raw Point Clouds, Computer Graphics Forum 2018, vol. 37, No. 5. 12 pgs.

Shapiro V. et al., Separation for Boundary to CSG Conversion, ACM Transactions on Graphics, vol. 12, No. 1, Jan. 1993, pp. 35-55, 21 pgs.

P. Benko et al., Algorithm for reverse engineering boundary representation models, Computer-Aided Design 33 (2001), 839-851. 13 pgs.

A. Tumanin, Polygonal Mesh to B-Rep Solid Conversion: Algorithm Details and C++ Code Samples, posted on Sep. 4, 2019 on the Habr.com website, 11 pgs.

Benière et al., Recovering Primitives in 3D CAD meshes, Proceedings of SPIE, 2011, 9 pgs.

T. Du et al., InverseCSG: Automatic Conversion of 3D Models to CSG Trees, ACM transaction on Graphics, vol. 37, No. 6, Article 213, Nov. 2018, 16 pgs.

* cited by examiner

MACHINE-LEARNING FOR 3D SEGMENTATION

CROSS-REFERENCE TO RELATED APPLICATIONS

This application claims priority under 35 U.S.C. § 119 or 365 to European Application No. EP 21305293.9, filed Mar. 10, 2021. The entire contents of the above application(s) are incorporated herein by reference.

FIELD OF THE DISCLOSURE

The disclosure relates to the field of computer programs and systems, and more specifically to a method, system and program for machine learning, for 3D segmentation.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Within this context and other contexts, segmenting a 3D modeled object, which may also be simply referred to as "3D segmentation" or "segmentation", is gaining wide importance.

Given a 3D modeled object (e.g., a mesh), 3D segmentation generally consists in splitting/partitioning geometrical elements (e.g., the faces, e.g., and thereby possibly other elements such as vertices or edges) of the 3D modeled object into several connected clusters, called segments, where each segment maximizes its inner consistency, while minimizing its similarity with respect to the other segments. The result of the segmentation process yields a partition of the faces into several sets (the segments) in such a way that each segment represents a semantically consistent set with a clear border with respect to the other segments.

Segmentation may be used in shape abstractions processes, where a 3D geometry and/or feature thereof are retrieved from captured 3D data, as discussed for example in reference Kaiser A. et. al., *A survey of Simple Geometric Primitives Detection Methods for Captured 3D data*, Computer Graphics Forum, 2018. Segmentation may also be used in processes for constructing CSG (Constructive Solid Geometry) models (e.g., CSG trees), e.g., from 3D raw data, as discussed for example in references Wu. Q. et. al., *Constructing 3D CSG Models from 3D Raw Point Clouds*, Computer Graphics Forum, 2018, and Shapiro V. et. al., *Separation for Boundary to CSG Conversion*, ACM Transactions on Graphics, Vol. 12, No. 1, January 1993, Pages 35-55. These two references notably use RANSAC (Random Sample Consensus)-based approaches to detect an initial pool of features from which a feature tree is built.

There is however still a need for improved solutions for 3D segmentation.

SUMMARY

It is therefore provided a computer-implemented method of machine-learning. The method comprises providing a dataset of training samples. Each training sample includes a pair of 3D modeled object portions labelled with a respective value. The respective value indicates whether or not the two portions belong to a same segment of a 3D modeled object. The method further comprises learning a neural network based on the dataset. The neural network is configured for taking as input two portions of a 3D modeled object representing a mechanical part and for outputting a respective value. The respective value indicates an extent to which the two portions belong to a same segment of the 3D modeled object. The neural network is thereby usable for 3D segmentation.

The method may comprise one or more of the following:
  the neural network comprises:
    an encoding neural network configured for taking as input a portion of a 3D modeled object and for encoding it into a latent vector; and
    a predictive neural network configured for taking as input a pair of latent vectors outputted by the encoding neural network and for outputting a respective value that indicates an extent to which the two portions encoded by the latent vectors belong to a same segment of the 3D modeled object;
  the encoding neural network is configured for taking as input a portion of a 3D modeled object and neighboring portions of the input portion;
  the learning of the neural network comprises minimizing a loss comprising a term penalizing, for pairs of the dataset, a disparity between the respective value that indicates whether or not the two portions of a pair belong to a same segment of a 3D modeled object and the respective value outputted by the neural network for the two portions;
  the neural network transforms the input two portions each into a corresponding intermediary feature, and the loss further comprises another term penalizing, for said pairs of the dataset, a disparity between the respective value that indicates whether or not the two portions of a pair belong to a same segment of a 3D modeled object and a proximity between the intermediary features corresponding to the two portions;
  the term is of the type:

$$\sum_{i=1}^{N} d_{CE}(g_w(f_w(X_i^{(1)}), f_w(X_i^{(2)})), p_i),$$

where $((X_1^{(1)}, X_2^{(2)}), \ldots, (X_N^{(1)}, X_N^{(2)}))$ are pairs of the dataset, $g_w(f_w(X_i^{(1)}), f_w(X_i^{(2)}))$ is the respective value outputted by the neural network for the pair $((X_i^{(1)}, X_i^{(2)})$, $g_w \circ f_w$ is the neural network, $p_i$ is the respective value that indicates whether or not the portions $X_i^{(1)}$ and $X_i^{(2)}$ belong to a same segment of a 3D modeled object, and $d_{CE}$ is a loss penalizing a disparity between $g_w(f_w(X_i^{(1)}), f_w(X_i^{(2)}))$ and $p_i$, and the other term is of the type:

$$\sum_{i=1}^{N} d_M(f_w(X_i^{(1)}), f_w(X_i^{(2)}), p_i),$$

where, $f_w(X_i^{(1)})$ and $f_w(X_i^{(2)})$ are the intermediary features corresponding to the portions $X_i^{(1)}$ and $X_i^{(2)}$ of the pair $(X_i^{(1)}, X_i^{(2)})$, and $d_M$ is a loss penalizing a disparity between $p_i$ and a proximity between $f_w(X_i^{(1)})$ and $f_w(X_i^{(2)})$;

the providing of the dataset comprises:
providing an initial dataset of segmented 3D modeled objects; and
for each segmented 3D modeled object of the initial dataset, generating pairs of portions of the segmented 3D modeled object, the portions of a pair belonging either to a same segment of the segmented 3D modeled object or to different segments, each pair including a respective value that indicates whether or not the two portions belong to a same segment of a 3D modeled object;
for one or more segmented 3D modeled objects of the initial dataset, the generating of the pairs comprises generating pairs of portions for which at least one portion does not belong entirely to a single segment; and/or
the providing of the dataset further comprises creating mini-batches of pairs, the learning being carried out mini-batch by mini-batch.

It is further provided a neural network learnable according to the method, e.g., a neural network having been learnt by the method. The neural network forms a computer-implemented data structure having layers of neurons with weights (also referred to as parameters) of which values are settable (e.g., have been set) by the learning according to the method.

It is further provided a computer-implemented method of use of the neural network, for 3D segmentation. The method of use comprises providing a 3D modeled object. The method of use further comprises applying the neural network to pairs of portions of the 3D modeled object, thereby outputting a set of values. Each value is for a respective pair of portions of the 3D modeled object. The value indicates an extent to which the two portions belong to a same segment of the 3D modeled object. The method of use further comprises performing a segmentation of the 3D modeled object based on a set of one or more similarity indicators between neighboring portions of the 3D modeled object. The set of similarity indicators includes the set of values.

The performing of the segmentation may comprise:
performing a network-based segmentation of the 3D modeled object based on the set of values and then another segmentation of the 3D modeled object based on at least one other similarity indicator, or performing said another segmentation and then the network-based segmentation; or
performing the segmentation of the 3D modeled object based only on the set of values; or
performing the segmentation of the 3D modeled object based on the set of values combined with at least one other similarity indicator.

It is further provided a computer program comprising instructions for performing the method and/or the method of use.

It is further provided a device comprising a computer-readable data storage medium having recorded thereon the computer program and/or the neural network.

The device may form or serve as a non-transitory computer-readable medium, for example on a SaaS (Software as a service) or other server, or a cloud based platform, or the like. The device may alternatively comprise a processor coupled to the data storage medium. The device may thus form a computer system in whole or in part (e.g., the device is a subsystem of the overall system). The system may further comprise a graphical user interface coupled to the processor.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Non-limiting examples will now be described in reference to the accompanying drawings, where.

DETAILED DESCRIPTION

Figure 1:
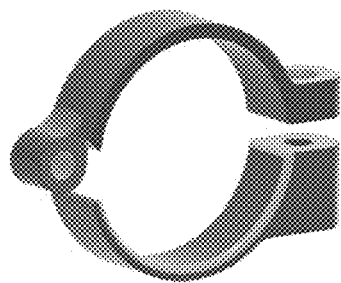
FIGS. 1, 2, 3, 4, 5, 6, and 7 illustrate the methods.
Figure 2:
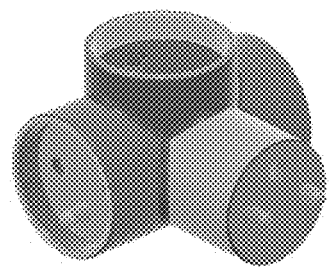
Figure 3:
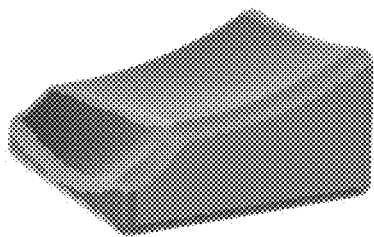
Figure 4:
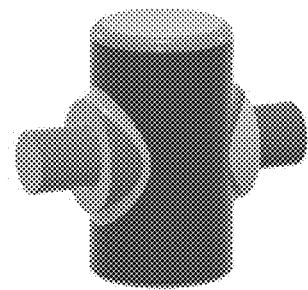
Figure 5:
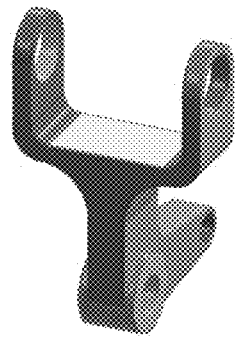
Figure 6:
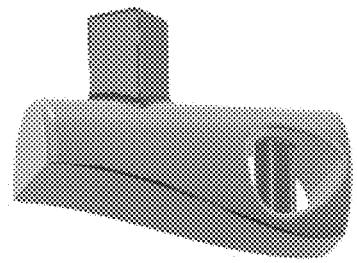

It is provided a computer-implemented method of machine-learning. The method comprises providing a dataset of training samples. Each training sample includes a pair of 3D modeled object portions labelled with a respective value (i.e., each pair is labelled with a respective value). The respective value indicates whether or not the two portions belong to a same segment of a 3D modeled object. The method further comprises learning a neural network based on the dataset. The neural network is configured for taking as input two portions of a 3D modeled object representing a mechanical part and for outputting a respective value. The respective value indicates an extent to which the two portions belong to a same segment of the 3D modeled object. The neural network is thereby usable for 3D segmentation. The method may be referred to as "the learning method".

The learning method constitutes an improved solution for 3D segmentation.

Notably, the learning method learns a neural network usable for 3D segmentation. In other words, the neural network constitutes a tool for 3D segmentation, i.e., that may be used in a method of 3D segmentation.

The neural network is configured and learnt to take as input any pair of portions of a 3D modeled object representing a mechanical part and to output a respective value that indicates an extent to which the two portions belong to a same segment of the 3D modeled object. In other words, the output of the neural network indicates an extent to which the two portions may be classified as belonging to a same segment of the 3D modeled object, e.g., a probability or a confidence score that the two portions belong to the same segment. The word "segment" is to be understood as a segment of a segmentation, that is a geometrically coherent surface portion of the 3D modeled object. The output of the neural network is thus directly usable in a segmentation algorithm or method that uses information on, for (e.g., all)

pairs of neighboring portions of a 3D modeled object to segment, an extent to which two neighboring portions of a pair belong to the same segment.

Specifically, many segmentation algorithms or methods perform the segmentation of a 3D modeled object based on a set of one or more similarity indicators between neighboring portions of the 3D modeled object, each similarity indicator comprising a set of values each indicative of an extent to which two neighboring portions of the 3D modeled object belong to a same segment, i.e., a set of shape similarity values between neighboring portions of the 3D modeled object. The neural network may be applied to (e.g., all) pairs of neighboring portions of the 3D modeled object, the application resulting in the neural network outputting respective values, each for a respective pair, each indicating an extent to which the two portions of the pair belong to a same segment of the 3D modeled object. These respective values altogether form a set of values which is a similarity indicator on which a segmentation algorithm or method may be based. The output of the neural network is thus directly usable in a segmentation algorithm, i.e., without pre-processing (e.g., pre-segmentation). Furthermore, the output of the neural network already provides a stopping criterion for such an algorithm: to stop the algorithm, it suffices for example to impose the criterion that two portions are merged/assembled in a segment only if their respective value (outputted by the neural network) is larger than a tolerance threshold, such that the segmentation stops when there remains only pairs of portions of the 3D modeled object being segmented for which the respective value (outputted by the neural network) is lower than the threshold.

Furthermore, using a set of values outputted by the neural network in a segmentation algorithm allows a relatively fast segmentation. Indeed, a similarity indicator is obtained only by applying the neural network to pairs of portions of the 3D modeled object, which can be done relatively fast once the neural network is already learnt. In other words, a similarity indicator is available relatively fast by simply applying the neural network. Complex computations for obtaining the similarity indicator are thus avoided during the segmentation, once the neural network is learnt.

Moreover, the learning method provides robustness to the neural network for the following reasons. First, the learning method only relies on the respective values of the pairs of the training dataset to carry out the learning, and for example not on explicit definitions (e.g., parameterization and/or primitive equations) of the portions of the pairs. Thereby the neural network does not require explicit definitions of its inputs to efficiently work. Second, the neural network outputs a respective value for a pair of portions based only on the portions, and in examples on their local context, without any knowledge of the whole 3D modeled objects to which the portions belong. This improves the generalization power of the neural network by allowing the generalization of the neural network to unseen shapes, as it does not depend on global class-specific features. Third, the neural network's robustness depends on the training dataset (e.g., its completeness and/or its variability), such that neural network may be used for segmenting any type/class of 3D modeled objects with accuracy, provided that the training dataset is suitably chosen for this purpose.

As previously discussed, the output of the neural network is directly usable in a method of 3D segmentation, i.e., a method for segmenting a 3D modeled object/performing a 3D segmentation of the 3D modeled object. As widely known, given a 3D modeled object (e.g., a mesh), 3D segmentation generally consists in splitting/partitioning the 3D modeled object (or faces thereof) into several connected clusters, called segments, where each segment maximizes its inner consistency, while minimizing its similarity with respect to the other segments, the clusters/segments being the result of the segmentation and being possibly referred to as "the segmentation".

The output of the neural network may be used in any method of 3D segmentation that implements this general segmentation framework. Specifically, the output of the neural network may be used in any method of 3D segmentation that takes as input a 3D modeled object and, based on one or more similarity indicators, outputs a set of segments of the 3D modeled object.

The set of segments may be referred to as "the segmentation outputted/yielded by the method of 3D segmentation" (i.e., of the 3D modeled object), or simply as "the segmentation". Each segment identified/outputted by the method of 3D segmentation is a portion of the 3D modeled object constituting a surface which forms a coherent portion of the shape of the 3D modeled object. In other words, a segment may be defined as a portion of the shape of the 3D modeled object that is coherent geometrically. Each segment identified by the method of 3D segmentation tends to maximize its inner consistency, while minimizing its similarity with respect to the other segments, with a clear border with respect to the other segments. For example, each segment may form an elementary surface of the 3D modeled object, e.g., that can be represented (e.g., fitted and/or parameterized) by a single CAD feature (e.g., a CATIA feature).

Each segment may form a surface which is coherent from the point of view of the manufacturing of the mechanical part. In other words, the mechanical part may be, in the real-world, divided into portions, each portion having a respective geometry requiring or adapted to a respective manufacturing process (e.g., molding, additive manufacturing or machining), each portion being represented in the segmentation outputted by the method of 3D segmentation by one or more segments. In yet other words, the set of segments outputted by the method of 3D segmentation may consist in subsets each of one or more segments, where for each subset, the one or more segments of the subset altogether represent a surface shape of a portion of the mechanical part (i.e., a layout of material) coherent from a point of view of the manufacturing, i.e., requiring or adapted to a certain manufacturing process (e.g., possibly to be chosen among several suitable manufacturing processes). For example, one or more such subsets may each represent a respective portion of the mechanical part to be manufactured by machining and having each a shape (i.e., a geometry) adapted to be a path of a machining tool. Additionally or alternatively, one or more other subsets may each represent a respective portion of the mechanical part to be manufactured by molding and having each a shape (i.e., a geometry) corresponding to the shape (i.e., the geometry) of a coherent portion of the mold. The mold may itself be manufactured by machining and each such portion may present a shape (i.e., a geometry) adapted to be a path of a machining tool. Additionally or alternatively, one or more other subsets may each represent a respective portion of the mechanical part to be manufactured by additive manufacturing and having each a shape (i.e., a geometry) corresponding to the shape (i.e., the geometry) of a final outer layer formed by the additive manufacturing process. A segmentation method using the output of the neural network thus allows to identify portions of the mechanical part coherent in terms of manufacturing.

Any method of 3D segmentation herein may be any 3D segmentation that segments a 3D modeled object (i.e., outputs a set of segments for the input 3D modeled object) based on one or more similarity indicators. Such a method may comprise one or more segmentation steps. Each segmentation step performs at least a part of the segmentation of the 3D modeled object based on one or more similarity indicators. Each segmentation step may itself be referred to as a segmentation as the segmentation step outputs segments. The segmentation step may output segments only for a part of the 3D modeled object, e.g., the segmentation step performs only a partial segmentation of the 3D modeled object, or the segmentation step may output initial or intermediary segments for the whole 3D modeled object that may require then at least one other segmentation step, the segmentation step being possibly also referred to as "partial" (i.e., it is an intermediary state/result). This partial segmentation may complete one or more other previous partial segmentations, each outputted by another respective segmentation step, and/or may be completed by one or more other subsequent partial segmentations, each outputted by another respective segmentation step. Each segmentation step may be based on a single similarity indicator, i.e., the segmentation step identifies segments based only on the single similarity indicator. Alternatively, the segmentation step may be based on several similarity indicators, and in this case the segmentation step identifies segments based on these similarity indicators. The method of 3D segmentation may comprise only one single segmentation step, which thus segments entirely the 3D modeled object. Optionally, the method of 3D segmentation may comprise any filtering of the segments, as widely known in 3D segmentation. The method of 3D segmentation, or any segmentation step thereof, may use any 3D segmentation algorithm. Such an algorithm may consist in an iterative exploring and merging of pairs of portion of the 3D modeled object that is based on one or more similarity indicators. The iterative exploring and merging includes updating the similarity indicator(s) upon each merging of portions, which, in case the output of the neural network is used as a similarity indicator, includes re-applying the neural network upon each merge so as to recompute/update the respective values after the merge. Such algorithm may be based on the 3D modeled object itself or on any data structure representing the 3D modeled object, such as a dual graph for a mesh or a nearest neighbor graph for a point cloud. The algorithm may be any suitable algorithm, and may for example comprise a hierarchical clustering or a region-growing algorithm.

Any similarity indicator herein may be a set of values each indicating an extent (e.g., a probability, a confidence score, a quantification, a measure) to which two neighboring portions (also referred to as "surfaces") of a 3D modeled object to be segmented belong to a same segment. A set of values outputted by the neural network constitutes such a similarity indicator as previously discussed. Any similarity indicator herein may alternatively be a set of distance values (i.e., of values of a distance) each between two neighboring portions and each quantifying a shape similarity between the neighboring portions. Any similarity indicator herein may for example be a set of values of a centroid curvature distance which penalizes mean curvature discrepancy between surfaces (i.e., favors/promotes the merging of surfaces with a low-varying curvature at their border), the distance being for example given by the formula $$d(N_1, N_2) = \max_{i \in \{min, max\}} (\overline{k}_i^{(1)} - \overline{k}_i^{(2)})^2,$$

where $N_1$ and $N_2$ represent neighboring surfaces and $\overline{k}_{min/max}^{(j)}$ represents a mean minimal or maximal curvature of $N_j$. Any similarity indicator herein may alternatively be a set of values of a border curvature smoothness distance, which rewards curvature smoothness around a boundary (also referred to as "border") between surfaces (i.e., favors/promotes the merging of surfaces which are locally smooth curvature-wise around their common border), the distance being for example given by the formula $$d(N_1, N_2) = \sum_{(f_1, f_2)} \max_{i \in \{min, max\}} \left( \frac{k_i^{(f_1)} - k_i^{(f_2)}}{[\min(|k_i^{(f_1)}|, |k_i^{(f_2)}|)]_{[k_0, k_1]}} \right)^2,$$

where $N_1$ and $N_2$ represent neighboring surfaces, $(f_1, f_2)$ represent couples of neighboring surface portions belonging respectively to $N_1$ and $N_2$, and $k_{min/max}^{(j)}$ is a minimal or maximal curvature of fj, $[\ldots]_{[k_0, k_1]}$ represents a clamping of a value to the segment $[k_0, k_1]$, and $k_0$ and $k_1$ are regulation values. Any similarity indicator herein may alternatively be a set of values of a centroid normal distance, which penalizes mean normal directions discrepancy between surfaces (i.e., favors/promotes the merging of surface with similar normal directions), the distance being for example given by the formula $$d(N_1, N_2) = 1 - |\overline{n}^{(1)} \cdot \overline{n}^{(2)}|,$$

where $N_1$ and $N_2$ represent neighboring surfaces, and $\overline{n}^{(j)}$ represents a mean normal of $N_j$. Any similarity indicator herein may alternatively be a set of values of a distance penalizing mean curvature discrepancy between surfaces and/or penalizing irregularity of merged surfaces. The distance may be of the type:

$$d(N_1, N_2) = (|\overline{k}_{max}^{(1)}| - |\overline{k}_{max}^{(2)}|)^2 \times d_{shape\ factor}(N_1, N_2),$$

where $N_1$ and $N_2$ represent neighboring surfaces, $\overline{k}_{max}^{(j)}$ represents a mean maximal curvature of $N_j$, and where:

$$d_{shape\ factor}(N_1, N_2) = 1 + \max_{i \in \{1,2\}} \left( \left[ \frac{P_{N_1 \cup N_2}}{\sqrt{A_{N_1 \cup N_2}}} - \frac{P_{N_1 \cup N_2}}{\sqrt{A_{N_i}}} \right]_{\mathbb{R}^+} \min\left(\frac{A_{N_i}}{\alpha A_{N_{\bar{i}}}}, 1\right) \right)^2,$$

where $P_N$ represents the perimeter of N, $A_N$ the area of N, $[\ldots]\mathbb{R}_+$ a clamping to $\mathbb{R}^+$, $N_{\bar{i}}$ a node $\in \{N_1, N_2\}$ which is not $N_i$, and $\alpha$ a hyper-parameter defining a reduced impact of a small surface.

As an application of the neural network for 3D segmentation, it is further provided a method of use of the neural network for 3D segmentation, i.e., the method of use comprises a method of 3D segmentation that is based on one or more similarity indicators, one of which being a set of values outputted by the neural network. The method of use may be referred to as "the segmentation method".

The segmentation method comprises providing a 3D modeled object representing a mechanical part, i.e., to be segmented. The providing of the 3D modeled object may comprise measuring or acquiring the 3D modeled object, e.g., by providing physical sensors and operating them on the mechanical part (e.g., this may for example consist in scanning the mechanical part), and then performing a 3D reconstruction process to obtain the 3D modeled object. Alternatively, the providing of the 3D modeled object may comprise creating the 3D modeled object, e.g., by sketching it. In yet another alternative, the providing of the 3D modeled object may comprise retrieving the 3D modeled object from a (e.g., distant) database on which the 3D modeled object has been stored further to its creation or acquirement.

The segmentation method then comprises applying the neural network to pairs of portions of the 3D modeled object. This outputs a set of respective values, each for a respective pair of portions (i.e., neighboring portions) of the 3D modeled object, and each indicating an extent to which the two portions belong to a same segment of the 3D modeled object.

The segmentation method then comprises performing a segmentation of, i.e., applying/performing a method of 3D segmentation to, the 3D modeled object based on a set of one or more similarity indicators between neighboring portions of the 3D modeled object. The set of similarity indicators includes the set of values, i.e., the outputs of the neural network when applied to pairs of neighboring portions of the 3D modeled object is used by the 3D segmentation method.

The performing of the segmentation may comprise performing the segmentation of the 3D modeled object based only on the set of values. In other words, the performed segmentation comprises only one segmentation step that is based on the set of values outputted by the neural network. The segmentation step may use any segmentation algorithm, such as a hierarchical clustering algorithm or a region growing algorithm.

Alternatively, the performing of the segmentation may comprise performing a network-based segmentation (i.e., a segmentation based on the use of the neural network) of the 3D modeled object based on the set of values and then another segmentation of the 3D modeled object based on at least one other similarity indicator. In other words, the performed segmentation comprises two segmentation steps, the network-based segmentation and the other segmentation.

The network-based segmentation is based on the set of values outputted by the neural network, and may use any segmentation algorithm, such as a hierarchical clustering algorithm or a region growing algorithm. The other segmentation is based on one or more other similarity indicators (i.e., other than the set of values outputted by the neural network), and may as well use any segmentation algorithm, such as a hierarchical clustering algorithm or a region growing algorithm. The other segmentation may use the same segmentation algorithm than the one used by the network-based segmentation.

The other segmentation may be any example of the hierarchical segmentation disclosed in European Patent Application EP21305195.6, filed on Feb. 16, 2021. This hierarchical segmentation comprises a first segmentation, i.e., which forms a segmentation step of the hierarchical segmentation. The first segmentation comprises identifying, among surfaces of the 3D modeled object, first segments each corresponding to a simple geometric surface of the 3D modeled object. A simple geometric surface is a primitive exhibiting at least one slippable motion. The hierarchical segmentation comprises then a second segmentation, i.e., which forms a subsequent segmentation step of the hierarchical segmentation. The second segmentation comprises identifying, among non-identified surfaces of the 3D modeled object, second segments each corresponding to a free-form surface of the 3D modeled object. As described in European Patent Application EP21305195.6, the first segmentation may comprise three segmentation steps (referred to as "executions of the exploring and merging" in this European Patent Application), each based on a respective first distance, the values of which forming a similarity indicator. As also described in European Patent Application EP21305195.6, the second segmentation may form a single segmentation step based on a one second distance. The content of European Patent Application EP21305195.6, and notably the description of the hierarchical segmentation and of all the features and examples thereof, including the described implementation with a hierarchical graph clustering, is incorporated herein by reference.

Alternatively, the performing of the segmentation may comprise performing the segmentation of the 3D modeled object based on the set of values combined with at least one other similarity indicator. In other words, the performed segmentation comprises a single segmentation step based on the set of values combined with at least one other similarity indicator, i.e., based on a similarity indicator formed by the combination of the set of values and of one or more other similarity indicators. This similarity indicator may for example be a set of values each indicating an extent (e.g., a probability, a confidence score, a quantification, a measure) to which two neighboring portions (also referred to as "surfaces") of the 3D modeled object belong to a same segment, each value being a combination of the respective value outputted by the neural network for the two portions and of one or more values each of a respective similarity indicator and each indicating an extent to which the two portions belong to a same segment. For example, the value may be a sum of the respective value and of one or more similarity values (e.g., values each obtained from a respective distance) each quantifying a shape similarity between the two portions. Alternatively, the value may be a multiplication of the respective value by the one or more similarity values. Alternatively, the value may be a mean of the respective value and of the one or more similarity values.

As widely known in the field of manufacturing CAD, a segmentation such as the segmentation outputted by the segmentation method or any other method of segmentation that uses the output of the neural network may be used in various applications or processes which at some step require or need a segmentation. The segmentation forms an improved representation of the outer surface of the 3D modeled object, which may be of use in many applications. Furthermore, the segments may be parameterized, and thus made editable with CAD tools, further to the segmentation, which allows to manipulate (e.g., edit) these segments, which may also be of use in many applications. By "parameterized", it is meant that each segment may be fitted with exactly one 3D geometrical object represented by a parametric equation or a parametric function, thus involving one or more parameters, wherein the one or more parameters may take values each in a respective continuous range. A 3D parameterized geometrical object allows an easy manipulation and/or editability and/or efficient storage in memory, as opposed to non-parameterized 3D geometrical objects such as discrete representations (e.g., point clouds, meshes, dexel representations). For example, the segments may be fitted with canonic primitives (e.g., planes, spheres or cylinders) or parameterized with other adapted geometrical tools, e.g., with free-form parameterized surfaces such as NURBS or extruded surfaces. In any application of the segmentation, including those discussed hereinafter, the 3D modeled object may be a measured 3D modeled object, so performing a segmentation of the 3D modeled object processes the measured 3D modeled object and allows to ultimately edit the measured 3D modeled object (i.e., once segmented). The segmentation may thereby generally be used to segment a measured 3D modeled object and then processing it into an editable data structure.

In a first application, a segmentation such as the segmentation outputted by the segmentation method or any other method of segmentation that uses the output of the neural network is used for B-rep construction. B-rep construction using segments is discussed in references P. Benko et. al., *Algorithm for reverse engineering boundary representation models*, Computer-Aided Design 33 (2001), 839-851, in A. Tumanin, *Polygonal Mesh to B-Rep Solid Conversion: Algorithm Details and C++ Code Samples*, posted on Sep. 4, 2019 on the Habr.com website, and in Bénière et. al., Recovering Primitives in 3D CAD meshes, Proceedings of SPIE, 2011, which are all incorporated herein by reference. This first application comprises using the segmentation of the 3D modeled object to convert the 3D modeled object into a boundary representation (i.e., a B-rep, which is a collection of connected bounded surface elements, for example under the STEP file format, as widely known). The conversion may comprise fitting surfaces onto each segment, and bound the surfaces (i.e., determine the B-Rep's topological data, that is, the "is bounded by" relationships) using data about the segmentation. The segmentation method or any other method of segmentation that uses the output of the neural network may thus be included in a computer-implemented process for converting a 3D modeled object representing a mechanical part into a B-rep, the process comprising:

providing the segmentation of the 3D modeled object by performing the segmentation; and converting the 3D modeled object into a B-rep by fitting surfaces onto each segment of the segmentation and bound the surfaces based on the segmentation, according to any known method suitable for such conversion.

In a second application, a segmentation such as the segmentation outputted by the segmentation method or any other method of segmentation that uses the output of the neural network is used for feature-tree construction. Feature-tree construction based on segments (e.g., by fitting primitives to the segments) is discussed in references T. Du et. al., *InverseCSG: Automatic Conversion of 3D Models to CSG Trees*, ACM SIGGRAPH ASIA 2018, Wu. Q. et. al., *Constructing 3D CSG Models from 3D Raw Point Clouds*, Computer Graphics Forum, 2018, and Shapiro V. et. al., *Separation for Boundary to CSG Conversion*, ACM Transactions on Graphics, Vol. 12, No. 1, January 1993, Pages 35-55, which are all incorporated herein by reference. This second application comprises using the segmentation to construct a feature tree representation of the 3D modeled object. The construction comprises using first the segmentation and fitting primitives onto each segment to build a pool of CAD features, also referred to as "feature list" from which the feature tree is then built. The segmentation method or any other method of segmentation that uses the output of the neural network may thus be included in a computer-implemented process for constructing a feature tree from a 3D modeled object representing a mechanical part, the process comprising:

providing the segmentation of the 3D modeled object by performing the segmentation;

building a pool of CAD features (i.e., a feature list) by fitting surfaces onto each segment of the segmentation according to any known method; and building the feature tree from the fitted surfaces, according to any known method.

In a third application, a segmentation such as the segmentation outputted by the segmentation method or any other method of segmentation that uses the output of the neural network is used for re-meshing (i.e., if the provided 3D modeled object is a 3D mesh) or re-sampling (i.e., if the provided 3D modeled object is a 3D point cloud). The segments of the segmentation may be parameterized by canonic primitives and/or NURBS, which allows the re-meshing (i.e., if the provided 3D modeled object is a 3D mesh) or re-sampling (i.e., if the provided 3D modeled object is a 3D point cloud) of the 3D modeled object, by using each segment's surface definition. This re-meshing/re-sampling may be used to denoise (e.g., removing outlier points, notably for a 3D point cloud, or smoothing the outer surface of the 3D modeled object, notably for a 3D mesh) the 3D modeled object. Additionally or alternatively, it may be used to tessellate efficiently 3D meshes, i.e., adapt the size of the mesh's faces to the curvature of the corresponding surfaces in order to minimize the number of faces thereby optimizing the mesh's weight (i.e., storage-wise) while ensuring a maximal discretization distance to the exact surfaces. The segmentation method or any other method of segmentation that uses the output of the neural network may thus be included in a computer-implemented process for re-meshing (resp. re-sampling) a 3D modeled object that is a 3D mesh (resp. a 3D point cloud) representing a mechanical part, the process comprising:

providing the segmentation of the 3D modeled object by performing the segmentation;

parametrizing the segments each with a canonic primitive or with NURBS, thereby yielding surface definitions for all segments in the segmentation; and using each segment's surface definition to re-mesh (resp. re-sample) the 3D mesh (resp. the 3D point cloud), according to any known suitable method;

optionally, one or more of:

denoising the 3D mesh (resp. 3D point cloud) using the re-meshing (resp. re-sampling); and/or tessellating more efficiently the 3D mesh by adapting the size of the mesh's faces to the curvature of the corresponding surfaces in order to optimize the mesh's weight (i.e., storage-wise) while ensuring a maximal discretization distance to the exact surfaces.

In a fourth application, a segmentation such as the segmentation outputted by the segmentation method or any other method of segmentation that uses the output of the neural network is used for detecting anomalies in the 3D modeled object (e.g., manufacturing anomalies). This application may comprise comparing available knowledge of properties that the mechanical part should have with the segments of the segmentation, thereby yielding information about defects or anomalies for the mechanical part. For example, the available knowledge may comprise information such as "a cube portion of the mechanical part should have six large planar faces" or "usual mechanical parts should not have any small face portion". If the 3D modeled object portion which represents the cube is segmented into seven faces, or if some segments represent non-planar faces, this application may comprise deducting that the 3D modeled object features anomalies, such that the mechanical part features anomalies (i.e., manufacturing defects).

A segmentation such as the segmentation outputted by the segmentation method or any other method of segmentation that uses the output of the neural network may be used in other applications of 3D shape segmentation, for example 3D deformation, 3D rendering (geometric/material attributes computation, occlusion culling, shadows determination), 3D animation and/or shape compression. These applications are discussed in previously-cited reference Kaiser A. et. al., *A survey of Simple Geometric Primitives Detection Methods for Captured 3D data*, Computer Graphics Forum, 2018, which is incorporated herein by reference.

FIGS. 1 to 6 illustrate segmentations of mechanical parts, each figure showing a respective segmented mechanical part.

The learning method is now further discussed.

As known per se from the field of machine-learning, the processing of an input by a neural network includes applying operations to the input, the operations being defined by data including weight values. Learning a neural network thus includes determining values of the weights based on a dataset configured for such learning, such a dataset being possibly referred to as a learning dataset or a training dataset. For that, the dataset includes data pieces each forming a respective training sample. The training samples represent the diversity of the situations where the neural network is to be used after being learnt. Any training dataset herein may comprise a number of training samples higher than 1000, 10000, 100000, or 1000000. In the context of the present disclosure, by "learning a neural network based on a dataset", it is meant that the dataset is a learning/training dataset of the neural network, based on which the values of the weights (also referred to as "parameters") are set.

In the context of the learning method, the training dataset is the provided dataset of training samples each including a pair of 3D modeled object portions labelled with a respective value that indicates whether or not the two portions belong to a same segment of a 3D modeled object. Prior to the discussion on the providing of the dataset, data structures involved therein are now discussed.

Each training sample includes a pair of 3D modeled object portions, i.e., a pair of portions each being a portion of the 3D modeled object. A portion of a 3D modeled object is a surface of the 3D modeled object, i.e., a portion of the outer surface of the 3D modeled object. A point of the 3D modeled object is also considered as a portion in the present disclosure, i.e., the neural network is able to take as input portions which are points as well as portions which are geometric surfaces. In the context of a segmentation which iteratively merges surfaces/portions of a 3D modeled object, a portion may be the result of a merge between other portions. Any portion of any pair of the training dataset may also be the result of a merge of other portions, which makes the dataset particularly adapted to learn a robust neural network usable for 3D segmentation.

The learning method thus manipulates modeled objects. A modeled object is any object defined by data stored e.g., in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

Any 3D modeled object herein may represent a product such as a part or an assembly of parts, or possibly an assembly of products. By "3D modeled object", it is meant any object which is modeled by data allowing its 3D representation. A 3D representation allows the viewing of the part from all viewpoints (e.g., from various angles and/or distances). For example, a 3D modeled object, when 3D represented, may be handled and turned around any of its axes, or around any axis in the screen on which the representation is displayed. This notably excludes 2D icons, which are not 3D modeled. The 3D modeled object may represent the geometry of a product to be manufactured in the real world subsequent to the completion of its virtual design with for instance a CAD software solution or CAD system, such as a (e.g., mechanical) part or assembly of parts (or equivalently an assembly of parts, as the assembly of parts may be seen as a part itself from the point of view of the methods), or more generally any rigid body assembly (e.g., a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object may thus represent an industrial product which may be any mechanical part, such as a part of a terrestrial vehicle (including e.g., car and light truck equipment, racing cars, motorcycles, truck and motor equipment, trucks and buses, trains), a part of an aerial vehicle (including e.g., airframe equipment, aerospace equipment, propulsion equipment, defense products, airline equipment, space equipment), a part of a naval vehicle (including e.g., navy equipment, commercial ships, offshore equipment, yachts and workboats, marine equipment), a general mechanical part (including e.g., industrial manufacturing machinery, heavy mobile machinery or equipment, installed equipment, industrial equipment product, fabricated metal product, tire manufacturing product), an electro-mechanical or electronic part (including e.g., consumer electronics, security and/or control and/or instrumentation products, computing and communication equipment, semi-conductors, medical devices and equipment), a consumer good (including e.g., furniture, home and garden products, leisure goods, fashion products, hard goods retailers' products, soft goods retailers' products), a packaging (including e.g., food and beverage and tobacco, beauty and personal care, household product packaging).

Any 3D modeled object herein may form a discrete geometrical representation of a 3D real-world object, e.g., representing an object from the real world such as a mechanical part. The discrete geometrical representation is herein a data structure which comprises a discrete set of pieces of data. Each piece of data represents a respective geometrical entity positioned in a 3D space. Each geometrical entity represents a respective location of the 3D object (in other words, a respective portion of material constitutive of a solid represented by the 3D object). The aggregation (i.e., union or juxtaposition) of the geometrical entities represents altogether the 3D object. Any discrete geometrical representation herein may in examples comprise a number of such pieces of data higher than 100, 1000, or 10000.

Any discrete geometrical representation herein may for example be a 3D point cloud, each geometrical entity being a point. Any discrete geometrical representation herein may alternatively be a 3D mesh, each geometrical entity being a mesh tile or face. Any 3D mesh herein may be regular or irregular (i.e., consisting or not of faces of a same type). Any 3D mesh herein may be a polygonal mesh, for example a triangular mesh. Any 3D mesh herein may alternatively be a B-Rep. Any 3D mesh herein may be obtained from a 3D point cloud, for example by triangulating the 3D point cloud (e.g., with a Delaunay triangulation). Any 3D point cloud herein may be determined from physical measurements on a real object, for example within a 3D reconstruction process. The 3D reconstruction process may comprise providing the real object, providing one or more physical sensors each configured for acquiring a respective physical signal, and acquiring one or more respective physical signals by operating the one or more physical sensors on the real object (i.e., scanning the real object with each sensor). The 3D reconstruction may then automatically determine a 3D point cloud and/or a 3D mesh based on the measurements, according to any known technique. The one or more sensors may comprise a plurality of (e.g., RGB, and/or image or video) cameras and the determination may comprise a structure-from-motion analysis. The one or more sensors may alternatively or additionally comprise one or more depth sensors (e.g., on an RGB-depth camera) and the determination may comprise a 3D reconstruction from depth data. The one or more depth sensors may for example comprise a laser (e.g., a lidar) or an ultrasound emitter-receiver. Any discrete geometrical representation herein may alternatively be any type of CAD model.

Any 3D point cloud or 3D mesh herein may alternatively be obtained from a 3D modeled object representing a skin (i.e., outer surface) of a solid (e.g., corresponding to B-Rep model, which represents a skin, i.e., an exact surface), for example by ray-casting on the 3D modeled object or tessellating the 3D modeled object. The tessellating may be performed according to any 3D modeled object rendering process. Such a rendering process may be coded on any CAD system in order to display a graphical representation of the 3D modeled object. The 3D modeled object may be designed or have been designed by a user with a CAD system.

The providing of the dataset may comprise forming the dataset. The forming of the dataset may comprise providing an initial dataset of 3D modeled objects, or an initial dataset of 3D modeled object portions, and labelling pairs of 3D modeled object portions with the respective values. Alternatively, the forming of the dataset may comprise directly forming training samples each being a pair of portions already labelled with its respective value (e.g., by randomly generating the labelled pairs of portions from a CAD model).

In examples, the providing of the dataset comprises providing an initial dataset of segmented 3D modeled objects. This may comprise forming the initial dataset of segmented 3D modeled objects, e.g., by providing a dataset of non-segmented 3D modeled objects and segmenting them, or retrieving the already segmented 3D modeled objects from a (e.g., distant) database, e.g., by accessing the database and downloading the initial dataset. For example, the providing of the initial dataset may comprise selecting segmented 3D modeled objects within any dataset of CAD models each equipped with ground truth data (e.g., parameterizations), such as the ABC-Dataset. In other words, each segment may be equipped with ground truth data characteristic of the segment, such as a label indicative of the segment.

Then, the providing of the dataset comprises, for each segmented 3D modeled object of the initial dataset, generating pairs of portions of the segmented 3D modeled object. For each pair, the portions of a pair belong either to a same segment of the segmented 3D modeled object or to different segments. In other words, the generating of the pair is such that the two portions of the pair belong either to a same segment of the segmented 3D modeled object or to different segments. For each 3D modeled object, the generating of the pairs may comprise iteratively and randomly selecting portions of the 3D modeled object and forming pairs with these portions. This may include merging portions, i.e., some pairs may include one or more portions each resulting from the merging of other portions. Thereby, the pairs of the dataset may include portions having sizes that vary from one pair to another or even that vary within a pair. This allows to have in the training dataset pairs with portions corresponding to different levels of segmentation of the 3D modeled object, which improves robustness of the neural network once trained: this contributes to ensuring that the neural network performs equally well at any level/stage of a segmentation, as the neural network handles pairs with portions of different sizes (corresponding to different segmentation levels). Such pairs indeed occur in segmentations algorithms which iteratively merge 3D modeled object portions to form segments, resulting in neighboring portions that may have different sizes.

The generating is such that, for one or more pairs (e.g., for a substantial part of the pairs, e.g., all of them), each region of the pair belongs to a single respective segment of the segmented 3D modeled object, i.e., the region belongs entirely to the single respective segment. The two regions of the pair may both belong to the same respective segment or to different segments. For one or more segmented objects in the initial dataset, the generating of the pairs may comprise generating pairs of portions for which at least one portion does not belong entirely to a single segment. In other words, for each respective one of one or more (e.g., only a part of the) segmented 3D modeled objects, the generating is such that at least one pair of portions the 3D modeled object comprises at least one portion which does not belong entirely to a single segment of the 3D modeled object (i.e., the portion includes a first sub-portion belonging to a first segment and a second sub-portion belonging to a second segment, the first segment and the second segments being different segments). A portion which does not belong entirely to a single segment may be referred to as an "impure" portion. Training the neural network on pairs of portions which may present some level of impurity allows it to learn how to adapt to potential mistakes made (e.g., by the neural network) during a segmentation. In other words, if the neural network is fed with a pair of portions, at least one of which featuring impurity, the neural network may nevertheless output a satisfying value for these portions (i.e., the neural network is trained to do its best with mistakes it might encounter).

Each pair includes a respective value that indicates whether or not the two portions belong to a same segment of a 3D modeled object. In other words, the generating of the pairs may comprise, for each pair, labeling the pair with a respective value that indicates whether or not the two portions of the pair belong to a same segment. The labelling may be based on the ground truth data. In other words, the ground truth data may be used to determine whether the two portions of a pair belong to a same segment. For example, the labelling may comprise using the labels of each segment to which the two portions belong for labelling the pair, e.g., with the label "1" if the two portions belong to a same segment and "0" if they do not.

In any case, each training sample includes a pair of 3D modeled object portions labelled with a respective value that indicates whether or not the two portions belong to a same segment of a 3D modeled object. The value may be "1" if the two portions belong to a same segment and "0" if they do not. The neural network is then learnt on these training samples, the learning and the neural network being now further discussed.

The neural network is configured for taking as input two portions of a 3D modeled object representing a mechanical part and for outputting a respective value that indicates an extent to which the two portions belong to a same segment of the 3D modeled object. The outputted respective value is of the same type than the respective values of the pairs of the training dataset. The value may be a confidence score or a probability (i.e., a number belonging to [0,1]), the higher the value is, the higher the confidence or probability that the two portions belong to the same segment is. The neural network may have any architecture suitable for taking as input two portions and outputting a respective value.

Notably, the neural network may comprise an encoding neural network configured for taking as input a portion of a 3D modeled object and for encoding it into a latent vector. The latent vector is an intermediary feature encoding the input portion. The encoding may be meaningful in terms of segments because the encoding neural network is learnt so, i.e., the encoding neural network may encode relatively similarly two portions belonging to a same segment. The encoding neural network may be referred to as "the encoder". The encoding neural network may take as input, besides the portion, indices of the points of the portion (e.g., indices of point cloud points, if the 3D modeled object is a point cloud, or indices of mesh vertices, if the 3D modeled object is a mesh). The encoding neural network may also be configured for taking as input a portion of a 3D modeled object and neighboring portions of the input portion. In other words, besides the portion, the encoding neural network may also take as input neighboring portions of the input portion. For example, the encoding neural network may have a per-point neighborhood pooling architecture which produces a neighbor-aware latent vector/intermediary feature, i.e., the latent vector also encodes data on the neighborhood of the input portion, which further improves meaningfulness of the encoding in terms of segments. The per-point neighborhood pooling architecture may be any such architecture, such as PointNet++(discussed in reference C. Qi, L. Yi, H. Su, L. Guibas, *PointNet++: Deep Hierarchical Feature Learning on Point Sets in a Metric Space*, in NIPS, 2017, which is incorporated herein by reference), or DGCNN (discussed in Y. Wang, Y. Sun, Z. Liu, S. Sarma, M. Bronstein, J. Solomon, *Dynamic Graph CNN for Learning on Point Clouds*, in ACM, 2019, which is incorporated herein by reference) if the 3D modeled objects are 3D point clouds or MeshCNN (discussed in R. Hanocka, A. Hertz, N. Fish, R. Giryes, S. Fleishman, D. Cohen-Or, *MeshCNN: A Network with an Edge*, in ACM, 2019, which is incorporated by reference) if the 3D modeled objects are 3D meshes. This architecture may be combined with a Point-Net-like architecture (discussed in reference, C. Qi, H. Su, K. Mo, L. Guibas. PointNet, *Deep Learning on Point Sets for 3D Classification and Segmentation*, in CVPR, 2017, which is incorporated herein by reference), which produces a single latent vector representing an input portion.

Additionally, the neural network may also comprise a predictive neural network configured for taking as input a pair of latent vectors outputted by the encoding neural network and for outputting a respective value that indicates an extent to which the two portions encoded by the latent vectors belong to a same segment of the 3D modeled object. The respective value is of the same type than the respective values of the training samples (e.g., a confidence score or a probability, as previously discussed).

The learning of the neural network may comprise minimizing a loss. The loss may be any loss suitable for training the neural network to output a respective value indicating an extent to which the portions of an input pair of portions belong to a same segment. The loss may comprise a term penalizing, for pairs of the dataset (e.g., for the pairs of a mini-batch), a disparity between the respective value that indicates whether or not the two portions of a pair belong to a same segment of a 3D modeled object and the respective value outputted by the neural network for the two portions. In other words, the term may be a function of the respective value outputted by the neural network for two portions of a pair and of the respective value, which labels the pair, indicating whether or not the two portions belong to a same segment, and may tend to have a high value if this respective value indicates that the two portions belong (resp. do not belong) to a same segment while the respective value outputted by the neural network tends to indicate that the two portions do not belong (resp. belong) to a same segment.

The neural network may transform the input two portions each into a corresponding intermediary feature. For each portion, each corresponding intermediary feature encodes the portion, and the neural network may output the respective value for the two portions based on the corresponding encodings of the portions (i.e., the intermediary feature). For example, in the previously-discussed case where the neural network comprises an encoding neural network and a predictive neural network, the intermediary feature is, for the corresponding portion, the latent vector encoding the portion. In any case, the loss may further comprise another term penalizing, for said pairs of the dataset (i.e., the same pairs as those involved in the previously-discussed term of the loss), a disparity between the respective value that indicates whether or not the two portions of a pair belong to a same segment of a 3D modeled object and a proximity between the intermediary features corresponding to the two portions. Specifically, the proximity is any function quantifying whether or not the intermediary features (e.g., the latent vectors) are close (e.g., in terms of a distance between latent vectors, the proximity being for example based on such distance), and the other term is a function that tends to have a high value when the proximity tends to indicate that the two portions have similar (resp. disparate) intermediary features while the respective value indicates that the two portions do not (resp. do) belong to a same segment. The other term thereby contributes to train the neural network (e.g., the encoding neural network thereof) to encode input portions into intermediary feature (e.g., latent vectors) which are already meaningful in terms of segments, i.e., into intermediary features (e.g., latent vectors) which are close (e.g., in terms of a distance between latent vectors) if the two input portions belong to a same segment, and not close if not. This further improves robustness of the neural network.

The term may of the type:

$$\sum_{i=1}^{N} d_{CE}(g_w(f_w(X_i^{(1)}), f_w(X_i^{(2)})), p_i),$$

where $((X_1^{(1)}, X_2^{(2)}), \ldots, (X_N^{(1)}, X_N^{(2)}))$ are pairs of the dataset $g_w(f_w(X_i^{(1)}), f_w(X_i^{(2)}))$ is the respective value outputted by the neural network for the pair $(X_i^{(1)}, X_i^{(2)})$, $g_w \circ f_w$ is the neural network, $p_i$ is the respective value that indicates whether or not the portions $X_i^{(1)}$ and $X_i^{(2)}$ belong to a same segment of a 3D modeled object, and $d_{CE}$ is a loss penalizing a disparity between $g_w(f_w(X_i^{(1)}), f_w(X_i^{(2)}))$ and $p_i$, and the other term is of the type:

$$\sum_{i=1}^{N} d_M(f_w(X_i^{(1)}), f_w(X_i^{(2)}), p_i),$$

where, $f_w(X_i^{(1)})$ and $f_w(X_i^{(2)})$ are the intermediary features corresponding to the portions $X_i^{(1)}$ and $X_i^{(2)}$ of the pair $(X_i^{(1)}, X_i^{(2)})$, and $d_M$ is a loss penalizing a disparity between $p_i$ and a proximity between $f_w(X_i^{(1)})$ and $f_w(X_i^{(2)})$.

$((X_1^{(1)}, X_2^{(2)}), \ldots, (X_N^{(1)}, X_N^{(2)}))$ may be pairs forming a mini-batch, N being the size of the mini-batch, in case the training is carried out mini-batch by mini-batch. In the case where the neural network comprises an encoding neural network and a predictive neural network, $f_w$ is the encoding neural network and $g_w$ is the predictive neural network, $f_w(X_i^{(1)})$ and $f_w(X_i^{(2)})$ being then the latent vectors encoding, respectively, the portions $X_i^{(1)}$ and $X_i^{(2)}$.

$d_{CE}$ may be a loss penalizing the neural network output value with regards to the respective value labelling the input pair, for example a binary cross-entropy loss. $d_{CE}$ helps the neural network to predict/output a respective value in accordance with the ground truth part belonging knowledge. For example, $d_{CE}$ may be of the type:

$$-(p_i \log(g_w(f_w(X_i^{(1)}), f_w(X_i^{(2)}))) + (1-p_i) \log(1-g_w(f_w(X_i^{(1)}), f_w(X_i^{(2)})))).$$

$d_M$ is a loss penalizing intermediary feature proximity if the input portions don't belong to a same segment, or promoting feature proximity if they do. In other words, $d_M$ is a metric learning loss on the intermediary features (e.g., latent vectors) corresponding to the input portions. For example, $d_M$ may be of the type:

$$d_M(f_w(X_i^{(1)}), f_w(X_i^{(2)}), p_i) = p_i \|f_w(X_i^{(1)}) - f_w(X_i^{(2)})\|^2 + (1 - p_i)\max(0, \alpha - \|f_w(X_i^{(1)}) - f_w(X_i^{(2)})\|^2),$$

where $\alpha$ is a hinge loss margin parameter representing a desired minimum distance between portions not belonging to a same segment. In such a case, the loss is designed so that the encoding neural network learns features such that the Euclidian distance on those features discriminates portions not belonging to a same segment by a large enough margin. $d_M$ helps the encoding network learn meaningful discriminatory features.

The loss may be given by the formula:

$$L(w) = \sum_{i=1}^{N} d_{CE}(g_w(f_w(X_i^{(1)}), f_w(X_i^{(2)})), p_i) + \lambda d_M(f_w(X_i^{(1)}), f_w(X_i^{(2)}), p_i),$$

where $\lambda$ is a trade-off parameter. $\lambda$ may be chosen so that $d_{CE}$ and $\lambda d_M$ have the same order of magnitude, so that both are trained with the same importance. $\lambda$ may for example equal 0.6.

The loss may comprise other terms, such as one or more losses, e.g., with respective trade-off parameters, designed for the neural network to predict one or more meaningful quantities (e.g., normals and/or curvatures). This trains the neural network to encode features which include explicit meaningful information in order to compare portions.

The learning of the neural network may be carried out mini-batch by mini-batch. The learning may use any mini-batch stochastic optimization algorithm (e.g., stochastic gradient descent or Adam optimization algorithm). In such a case, the providing of the dataset further comprises creating mini-batches of pairs. In other words, the mini-batches of the mini-batch by mini-batch learning are created beforehand, i.e., before the learning. Thereby, the mini-batch by mini-batch learning is only based on mini-batches that entirely reflect the ground truth of the segmented 3D modeled objects involved in the training dataset. The creating of the mini-batches may comprise selecting pairs to form mini-batches of pairs. This may include selecting (e.g., for each mini-batch or for at least a part of them) pairs formed by portions of varying sizes and/or pairs having varying portions of varying sizes among them and/or pairs including at least one impure portion. This provides mini-batches with portions corresponding to varying levels of clustering, and accounting for errors made during the learning if there are pairs including at least one impure portion, as previously discussed.

An implementation of the learning method is now discussed.

The neural network learnt by this implementation may be used to segment any 3D shape into meaningful parts, leveraging deep learning techniques to have both robustness to noise and a notion of meaningful parts directly given by the training dataset's ground truth segmentations. This implementation introduces an improved neural network which learns to predict whether or not two portions (also referred to as "sub-parts") of a 3D shape belong to a same segment (also referred to as "part" or "relevant part") or not, allowing an iterative segmentation of a 3D shape.

Taking as input a dataset of 3D shapes labeled with their ground truth part decomposition, the implementation comprises first the providing of the training dataset, which includes generating intermediate under-segmented clusterings of these shapes, at varying levels of completion. Then the implementation comprises the learning of a neural network which takes as input two sub-parts of a given shape, and predicts the probability with which those two sub-parts belong to the same part. To learn this network, a mini-batch training scheme is used as follows:

1) Generating a set of pairs of sub-parts, from varying shapes and levels of clustering, which composes a mini-batch;
2) Computing the network's predictions on those pairs of sub-parts, along with intermediate features encoding each sub-part;
3) Minimize a loss on both the predictions and intermediate feature distance with regards to ground truth sub-parts matchings over the weights of the neural network, to optimize the predicted probabilities of belonging to a same part.

The neural network may then be used as distance between sub-parts (also referred to as "similarity indicator") in a segmentation algorithm such as a hierarchical clustering algorithm, eventually in conjunction to other terms. This, along with a threshold on the network predictions, allows for the segmentation of 3D shapes. This implementation allows the following:

Learning the probability with which two sub-parts belong to a same part, combined with a distance-based segmentation algorithm allows to not fix a number of segmented parts, contrary to end-to-end segmentation learning approaches.

No explicit definitions of the parts needed (e.g., primitives equations).

The network predicts a merging probability for a pair of sub-parts based only on the sub-parts and their local context, without any knowledge of the whole object. This eases its generalization to unseen shapes, as it does not depend on global class-specific features.

The learned merging probability may easily be combined with any other relevant metrics in a clustering algorithm (e.g., purity score, curvature distance).

Predicting a merging probability allows to directly exploit its value as a confidence score, which may for example be used as a stopping criterion in a clustering algorithm.

The training of a consistent metric on the encoded features adds robustness to the network's predictions by forcing meaningful features.

No sub-part initialization required.

Easy control over the desired types of parts to be segmented via the training dataset.

Mini-Batch Generation

The input of the implementation is an initial dataset of 3D shapes, either point clouds or 3D meshes, as well as, for each point of each 3D shape, the label of the ground truth part it belongs to. The providing of the training dataset comprises centering and scaling each shape into the unit sphere, i.e., such that its largest distance to its center is 1. The providing of the training dataset comprises discarding ambiguous points, that is points which lie on the intersection of at least two parts, and therefore do not have a unique possible label.

The providing of the training dataset then comprises the generating of pairs of sub-parts which will compose the input mini-batches of the neural network. To train the neural network to predict whether or not a pair of sub-parts belong to a same meaningful part, to then be used as clustering criteria in a clustering algorithm, the generating focuses on the clustering prediction of adjacent (regarding connectivity in a mesh or a maximum distance in point clouds) sub-parts. Furthermore, in order for the neural network to perform equally well at any stage of the clustering algorithm, the generating generates adjacent sub-parts at different levels of clustering, concretely meaning of different sizes.

In order to do so, for each input shape, the generating generates a corresponding graph, in which nodes initially correspond to points, and edges to either mesh edges for 3D meshes, or a maximum pairwise distance for point clouds. To generate different level of clusterings, the generating then iteratively and randomly merges connected nodes of same part label together. At any given point, a graph node then corresponds to a set of point belonging to the sub-part of a labeled part of the 3D shape, and an edge to two adjacent sub-parts. The generating then selects random sets of edges from varying levels of graph clustering to give as input to the neural network. This allows to access the ground truth clustering criteria of the edge: 1 if both nodes represent sub-parts of the same labeled part, and 0 if the corresponding parts are different. To efficiently train the neural network, the implementation may comprise sampling a given proportion of edges which should be clustered, and edges which should not.

To add robustness to the neural network's prediction when applied to real-life data, the generation may also generate impure sub-parts. When generating varying levels of clustering of the graph corresponding to an input 3D shape, this comprises also merging together nodes which do not represent the same part with a given probability. Over a certain impurity level (measured as the number of points in a node which do not belong to the most represented part), the node is then treated (with regards to ground truth clustering criteria as well as subsequent graph clustering) as if belonging to the most represented part. Training the neural network on sub-parts which may present some level of impurity allows it to learn how to adapt to mistakes it might eventually make during the clustering of a real-world 3D shape.

Network Architecture

The neural network is composed of a sub-part encoder followed by a prediction network.

The sub-part encoder $f_w$ takes as input a 3D shape (point cloud or mesh) as well as the indices of the points belonging to a sub-part. It first uses a per-point neighborhood pooling encoder architecture in order to produce a neighbor-aware feature per point in the sub-part. Such an architecture may for example be based on PointNet++(discussed in previously-cited reference C. Qi, L. Yi, H. Su, L. Guibas, *PointNet++: Deep Hierarchical Feature Learning on Point Sets in a Metric Space*, in NIPS, 2017) or DGCNN (discussed in previously-cited reference) Y. Wang, Y. Sun, Z. Liu, S. Sarma, M. Bronstein, J. Solomon, *Dynamic Graph CNN for Learning on Point Clouds*, in ACM, 2019) for point clouds, or MeshCNN (discussed in previously-cited reference R. Hanocka, A. Hertz, N. Fish, R. Giryes, S. Fleishman, D. Cohen-Or, *MeshCNN: A Network with an Edge*, in ACM, 2019) for meshes. Once those per-point features obtained, they are concatenated to the sub-parts coordinates and passed through a PointNet-like architecture (discussed in previously-cited reference, C. Qi, H. Su, K. Mo, L. Guibas. PointNet, *Deep Learning on Point Sets for 3D Classification and Segmentation*, in CVPR, 2017) which produces a single feature representing the sub-part. Using a neighbor pooling architecture improves the training as when clustering a mesh, the initial sub-parts will be reduced to a single point, and their local neighbors are therefore necessary in order to compute a meaningful feature.

Once both input sub-parts $X_1$ and $X_2$ are encoded into two feature vectors $f_w(X_1)$ and $f_w(X_2)$, those vectors are given as input to the prediction network $g_w$. This network, given two feature vectors $h_1$ and $h_2$, predicts a corresponding clustering probability $g_w(h_1, h_2) \in [0,1]$, amounting to how sure it is that those features represent sub-parts belonging to a same part. It first concatenates both features, and then applies to this concatenation a series of multilayer perceptrons (MLPs) followed by a final sigmoid activation in order to restrict the output to [0,1].

Training

The learning trains both networks $f_w$ and $g_w$ by a mini-batch stochastic optimization algorithm (e.g., stochastic gradient descent or Adam optimization algorithm), by minimizing a computed loss L(w) on a mini-batch of N pairs of 3D shapes sub-parts $((S_1^{(1)}, S_2^{(2)}), \ldots, (S_N^{(1)}, S_N^{(2)}))$. Let $((X_1^{(1)}, X_2^{(2)}), \ldots, (X_N^{(1)}, X_N^{(2)}))$ be the corresponding inputs for the sub-part encoder $f_w$, that is the shape (a point cloud eventually accompanied by a topology in the case of a mesh) and the indices relative to the shape's point cloud of the points corresponding to the sub-part, and let $p_1, \ldots, p_N$ be the ground-truth binary variables which amount to 1 if the corresponding pair of sub-parts belong to the same part and should therefore be merged, and 0 otherwise. The loss is given by the formula:

$$L(w) = \sum_{i=1}^{N} d_{CE}(g_w(f_w(X_i^{(1)}), f_w(X_i^{(2)})), p_i) + \lambda d_M(f_w(X_i^{(1)}), f_w(X_i^{(2)}), p_i).$$

$d_{CE}$ is a loss penalizing the network merging prediction with regards to the ground truth binary merging value, for example a binary cross-entropy loss. $d_{CE}$ helps the network predict a clustering probability in accordance with the ground truth part belonging knowledge. $d_M$ is a loss penalizing feature proximity if the input sub-parts do not belong to a same part, or promoting feature proximity if they do. In other words, $d_M$ is a metric learning loss on the sub-parts' encoded features. For example, $d_M$ may be of the type $$d_M(f_w(X_i^{(1)}), f_w(X_i^{(2)}), p_i) = \\ p_i \|f_w(X_i^{(1)}) - f_w(X_i^{(2)})\|^2 + (1 - p_i)\max(0, \alpha - \|f_w(X_i^{(1)}) - f_w(X_i^{(2)})\|^2),$$

where $\alpha$ is the hinge loss margin parameter representing a minimum distance between sub-parts not belonging to a same part. In this example, $d_M$ allows to train the encoder to learn features such that the Euclidian distance on those features discriminates sub-parts not belonging to a same part by a large enough margin. $d_M$ helps the encoding network learn meaningful discriminatory features. $\lambda$ is a trade-off parameter.

The neural network may also be configured to predict quantities such as normals or curvatures for instance with added corresponding losses and trade-off parameters to L(w). This trains the network to encode features which include explicit meaningful information in order to compare sub-parts.

Figure 7:
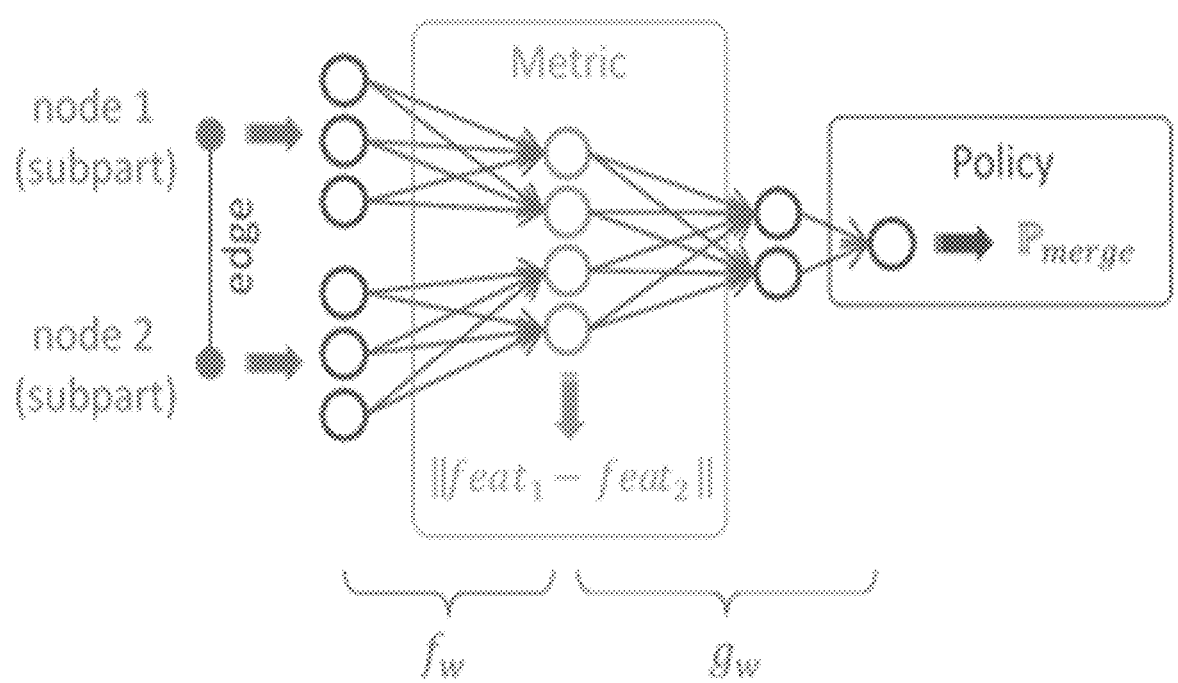

FIG. 7 illustrates the architecture of the neural network according to the implementation and the quantities (metric and merging probability) discriminated in the training loss.

Usage in a Segmentation Algorithm

Once trained, the neural network predicts for any pair of sub-parts the probability of them belonging to a same part. This information may be used in multiple distance-based segmentation algorithms as previously discussed in order to segment an input shape into meaningful parts. As previously discussed, such an algorithm may for example be a hierarchical clustering or region growing algorithm. For example, using a hierarchical clustering algorithm, the distance between each pair of clusters may be set as the opposite of the network prediction when applied to the pair, meaning that pairs of clusters will be merged in decreasing order of network predictions, and a stopping criteria can be set as a thresholds on the predictions.

The network may also be used in such segmentation algorithms in conjunction with other distances. For example, a compatibility distance on normals and/or curvatures may be combined with the network's merging probability predictions to obtain another expression of sub-part distance. Another neural network may also be trained to predict the purity of a sub-part of a shape, that is how likely a sub-part is to cover a single meaningful part. Such a neural network may be used to predict the purity of the combination of two sub-parts, and also combined to the merging predictions of neural network learnt by the implementation.

The methods are computer-implemented. This means that steps (or substantially all the steps) of the methods are executed by at least one computer, or any system alike. Thus, steps of the methods are performed by the computer, possibly fully automatically, or, semi-automatically. In examples, the triggering of at least some of the steps of the methods may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

Figure 8:
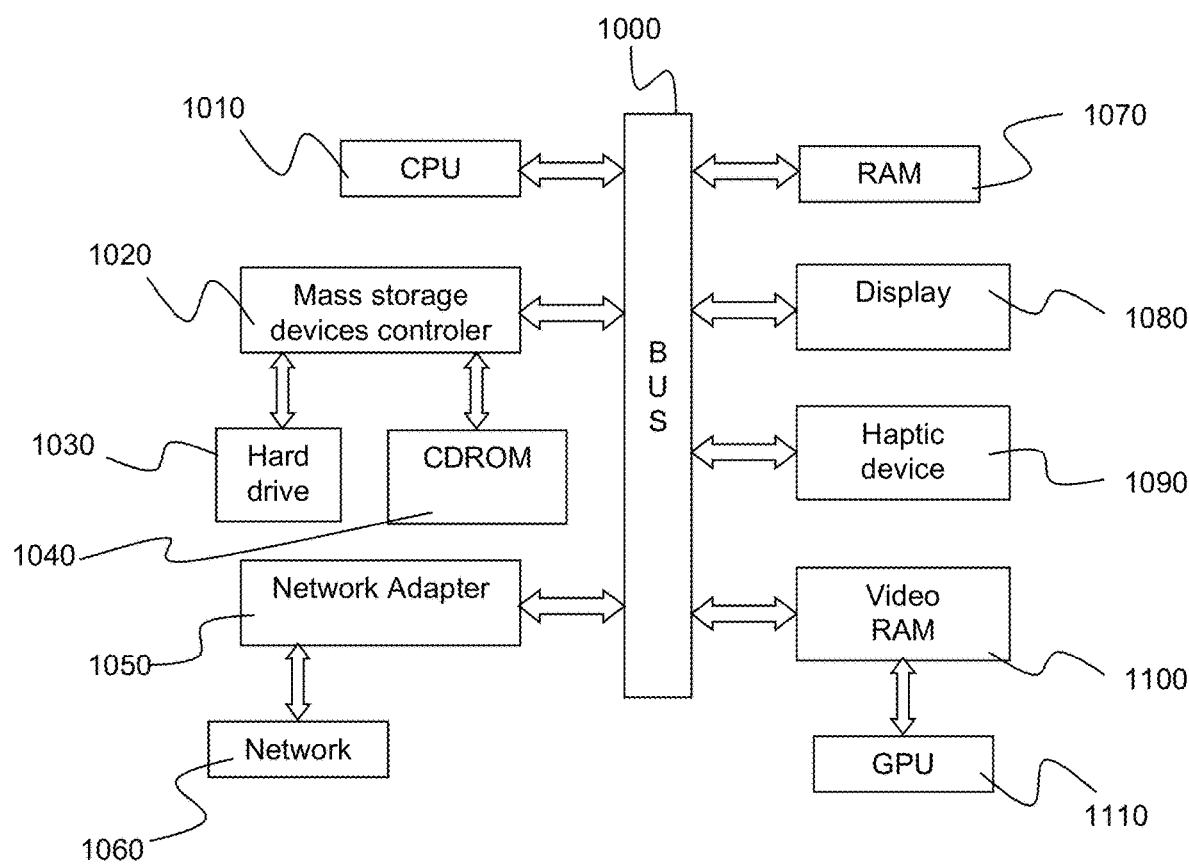
FIG. 8 shows an example of the system.

FIG. 8 shows an example of the system, wherein the system is a client computer system, e.g., a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the methods. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the methods.

The invention claimed is:

1. A computer-implemented method of machine-learning, the method comprising:
   obtaining a dataset of training samples each including a pair of 3D modeled object portions labelled with a respective value that indicates whether or not two portions belong to a same segment of a 3D modeled object; and
   learning a neural network based on the dataset, the neural network being configured to
      take as input two portions of a 3D modeled object representing a mechanical part, and
      output a respective value that indicates an extent to which the two portions belong to a same segment of the 3D modeled object, the neural network being thereby usable for 3D segmentation,
   wherein the learning of the neural network includes minimizing a loss comprising a term penalizing, for pairs of the dataset, a disparity between a respective value that indicates whether or not the two portions of a pair belong to a same segment of a 3D modeled object and a second respective value output by the neural network for the two portions,
   wherein the neural network transforms the input two portions each into a corresponding intermediary feature, and the loss further includes another term penalizing, for said pairs of the dataset, a disparity between the respective value that indicates whether or not the two portions of a pair belong to a same segment of a 3D modeled object and a proximity between the intermediary features corresponding to the two portions, and
   wherein the term is of a type:

$$\sum_{i=1}^{N} d_{CE}(g_w(f_w(X_i^{(1)}), f_w(X_i^{(2)})), p_i),$$

where $((X_1^{(1)}, X_2^{(2)}), \ldots (X_N^{(1)}, X_N^{(2)}))$ are pairs of the dataset, $g_w(f_w(X_i^{(1)}), f_w(X_i^{(2)}))$ is the respective value outputted by the neural network for the pair $(X_i^{(1)}, X_i^{(2)})$, $g_w \circ f_w$ is the neural network, $p_i$ is the respective value that indicates whether or not portions $X_i^{(1)}$ and $X_i^{(2)}$ belong to a same segment of a 3D modeled object, and $d_{CE}$ is a loss penalizing a disparity between $g_w(f_w(X_i^{(1)}), f_w(X_i^{(2)}))$ and $p_i$;
and the other term is of the type:

$$\sum_{i=1}^{N} d_M(f_w(X_i^{(1)}), f_w(X_i^{(2)}), p_i),$$

where, $f_w(X_i^{(1)})$ and $f_w(X_i^{(2)})$ are the intermediary features corresponding to portions $X_i^{(1)}$ and $X_i^{(2)}$ of the pair $(X_i^{(1)}, X_i^{(2)})$, and $d_M$ is a loss penalizing a disparity between $p_i$ and a proximity between $f_w(X_i^{(1)})$ and $f_w(X_i^{(2)})$.

2. The method of claim 1, wherein the neural network includes:
   an encoding neural network configured to take as input a portion of a 3D modeled object and to encode the portion into a latent vector, and
   a predictive neural network configured to take as input a pair of latent vectors outputted by the encoding neural network and to output a respective value that indicates an extent to which the two portions encoded by the latent vectors belong to a same segment of the 3D modeled object.

3. The method of claim 2, wherein the encoding neural network is configured to take as input a portion of a 3D modeled object and neighboring portions of the input portion.

4. The method of claim 1, wherein the obtaining of the dataset includes:
   obtaining an initial dataset of segmented 3D modeled objects; and
   for each segmented 3D modeled object of the initial dataset, generating pairs of portions of the segmented 3D modeled object, the portions of a pair belonging either to a same segment of the segmented 3D modeled object or to different segments, each pair including a respective value that indicates whether or not the two portions belong to a same segment of a 3D modeled object.

5. The method of claim 4, wherein for one or more segmented 3D modeled objects of the initial dataset, the generating of the pairs includes generating pairs of portions for which at least one portion does not belong entirely to a single segment.

6. The method of claim 4, wherein the obtaining of the dataset further includes creating mini-batches of pairs, the learning being carried out mini-batch by mini-batch.

7. A computer-implemented method of machine-learning for learning a neural network, the method comprising:
   obtaining a dataset of training samples each including a pair of 3D modeled object portions labelled with a respective value that indicates whether or not two portions belong to a same segment of a 3D modeled object; and
   learning the neural network based on the dataset, the neural network being configured to take as input two portions of a 3D modeled object representing a mechanical part and to output a respective value that indicates an extent to which the two portions belong to a same segment of the 3D modeled object, the neural network being thereby usable for 3D segmentation,
   wherein the 3D segmentation comprises:
      obtaining a 3D modeled object representing the mechanical part,
      applying the neural network to pairs of portions of the 3D modeled object, thereby outputting a set of values, each for a respective pair of portions of the 3D modeled object, each indicating an extent to which the two portions belong to a same segment of the 3D modeled object, and
      performing a segmentation of the 3D modeled object based on a set of one or more similarity indicators between neighboring portions of the 3D modeled object, the set of similarity indicators including the set of values,
   wherein the learning of the neural network includes minimizing a loss comprising a term penalizing, for pairs of the dataset, a disparity between a respective value that indicates whether or not the two portions of a pair belong to a same segment of a 3D modeled object and a second respective value output by the neural network for the two portions.
   wherein the neural network transforms the input two portions each into a corresponding intermediary feature, and the loss further includes another term penalizing, for said pairs of the dataset, a disparity between the respective value that indicates whether or not the two portions of a pair belong to a same segment of a 3D modeled object and a proximity between the intermediary features corresponding to the two portions, and wherein the term is of a type:

$$\sum_{i=1}^{N} d_{CE}(g_w(f_w(X_i^{(1)}), f_w(X_i^{(2)})), p_i),$$

where $((X_1^{(1)}, X_2^{(2)}), \ldots (X_N^{(1)}, X_N^{(2)}))$ are pairs of the dataset, $g_w(f_w(X_i^{(1)}), f_w(X_i^{(2)}))$ is the respective value outputted by the neural network for the pair $(X_i^{(1)}, X_i^{(2)})$, $g_w \circ f_w$ is the neural network, $p_i$ is the respective value that indicates whether or not portions $X_i^{(1)}$ and $X_i^{(2)}$ belong to a same segment of a 3D modeled object, and $d_{CE}$ is a loss penalizing a disparity between $g_w(f_w(X_i^{(1)}), f_w(X_i^{(2)}))$ and $p_i$, and the other term is of the type:

$$\sum_{i=1}^{N} d_M(f_w(X_i^{(1)}), f_w(X_i^{(2)}), p_i),$$

where, $f_w(X_i^{(1)})$ and $f_w(X_i^{(2)})$ are the intermediary features corresponding to portions $X_i^{(1)}$ and $X_i^{(2)}$ of the pair $(X_i^{(1)}, X_i^{(2)})$, and $d_M$ is a loss penalizing a disparity between $p_i$ and a proximity between $f_w(X_i^{(1)})$ and $f_w(X_i^{(2)})$.

8. The method of use of claim 7, wherein the performing of the segmentation further comprises:
performing a network-based segmentation of the 3D modeled object based on the set of values and then another segmentation of the 3D modeled object based on at least one other similarity indicator, or performing said another segmentation and then the network-based segmentation, or
performing the segmentation of the 3D modeled object based only on the set of values, or
performing the segmentation of the 3D modeled object based on the set of values combined with at least one other similarity indicator.

9. A device comprising:
a processor; and
a computer-readable data storage medium having recorded thereon a computer program comprising instructions for machine-learning that when executed by the processor causes the processor to be configured to:
obtain a dataset of training samples each including a pair of 3D modeled object portions labelled with a respective value that indicates whether or not two portions belong to a same segment of a 3D modeled object, and
learn a neural network based on the dataset, the neural network being configured to take as input two portions of a 3D modeled object representing a mechanical part and to output a respective value that indicates an extent to which the two portions belong to a same segment of the 3D modeled object, the neural network being thereby usable for 3D segmentation; and/or
implement 3D segmentation by the processor being configured to:
obtain a 3D modeled object representing a mechanical part, apply the neural network to pairs of portions of the 3D modeled object, thereby outputting a set of values, each for a respective pair of portions of the 3D modeled object, each indicating an extent to which the two portions belong to a same segment of the 3D modeled object, and
perform a segmentation of the 3D modeled object based on a set of one or more similarity indicators between neighboring portions of the 3D modeled object, the set of similarity indicators including the set of values,
wherein the processor is further configured to learn the neural network by being configured to minimize a loss comprising a term penalizing, for pairs of the dataset, a disparity between a respective value that indicates whether or not the two portions of a pair belong to a same segment of a 3D modeled object and a second respective value output by the neural network for the two portions,
wherein the neural network transforms the input two portions each into a corresponding intermediary feature, and the loss further includes another term penalizing, for said pairs of the dataset, a disparity between the respective value that indicates whether or not the two portions of a pair belong to a same segment of a 3D modeled object and a proximity between the intermediary features corresponding to the two portions, and wherein the term is of a type:

$$\sum_{i=1}^{N} d_{CE}(g_w(f_w(X_i^{(1)}), f_w(X_i^{(2)})), p_i),$$

where $((X_1^{(1)}, X_2^{(2)}), \ldots (X_N^{(1)}, X_N^{(2)}))$ are pairs of the dataset, $g_w(f_w(X_i^{(1)}), f_w(X_i^{(2)}))$ where $((x (1), x (2)) \ldots$ is the respective value outputted by the neural network for the pair $(X_i^{(1)}, X_i^{(2)})$, $g_w \circ f_w$ is the neural network, $p_i$ is the respective value that indicates whether or not portions $X_i^{(1)}$ and $X_i^{(2)}$ belong to a same segment of a 3D modeled object, and $d_{CE}$ is a loss penalizing a disparity between $g_w(f_w(X_i^{(1)}), f_w(X_i^{(2)}))$ and $p_i$,
and the other term is of the type:

$$\sum_{i=1}^{N} d_M(f_w(X_i^{(1)}), f_w(X_i^{(2)}), p_i),$$

where, $f_w(X_i^{(1)})$ and $f_w(X_i^{(2)})$ are the intermediary features corresponding to portions $X_i^{(1)}$ and $X_i^{(2)}$ of the pair $(X_i^{(1)}, X_i^{(2)})$, and $d_M$ is a loss penalizing a disparity between $p_i$ and a proximity between $f_w(X_i^{(1)})$ and $f_w(X_i^{(2)})$.

10. The device of claim 9, wherein the neural network includes:
an encoding neural network configured to take as input a portion of a 3D modeled object and for encoding the portion into a latent vector, and
a predictive neural network configured to take as input a pair of latent vectors outputted by the encoding neural network and to output a respective value that indicates an extent to which the two portions encoded by the latent vectors belong to a same segment of the 3D modeled object.

11. The device of claim 10, wherein the encoding neural network is configured to take as input a portion of a 3D modeled object and neighboring portions of the input portion.

12. The device of claim 9, wherein the processor is further configured to obtain the dataset by being further configured to:
   obtain an initial dataset of segmented 3D modeled objects, and
   for each segmented 3D modeled object of the initial dataset, generate pairs of portions of the segmented 3D modeled object, the portions of a pair belonging either to a same segment of the segmented 3D modeled object or to different segments, each pair including a respective value that indicates whether or not the two portions belong to a same segment of a 3D modeled object.

13. The device of claim 12, wherein for one or more segmented 3D modeled objects of the initial dataset, the processor is further configured to generate the pairs by being configured to generate pairs of portions for which at least one portion does not belong entirely to a single segment.

14. The device of claim 12, wherein the processor is further configured to obtain the dataset by being configured to create mini-batches of pairs, the learning being carried out mini-batch by mini-batch.

* * * * *